United States Patent
Mo et al.

(10) Patent No.: US 11,602,238 B2
(45) Date of Patent: Mar. 14, 2023

(54) COOKING UTENSIL, INNER COVER ASSEMBLY, AND LID

(71) Applicant: FOSHAN SHUNDE MIDEA ELECTRICAL HEATING APPLIANCES MANUFACTURING CO., LTD., Foshan (CN)

(72) Inventors: Rongkang Mo, Foshan (CN); Xingguo Yang, Foshan (CN); Wanbao Gao, Foshan (CN); Ruoyu Mei, Foshan (CN)

(*) Notice: Subject to any disclaimer, the term of this patent is extended or adjusted under 35 U.S.C. 154(b) by 496 days.

(21) Appl. No.: 16/621,688

(22) PCT Filed: Nov. 10, 2017

(86) PCT No.: PCT/CN2017/110471
§ 371 (c)(1),
(2) Date: Dec. 11, 2019

(87) PCT Pub. No.: WO2018/227866
PCT Pub. Date: Dec. 20, 2018

(65) Prior Publication Data
US 2020/0107666 A1    Apr. 9, 2020

(30) Foreign Application Priority Data

Jun. 16, 2017 (CN) .......................... 201720707365.7
Jun. 16, 2017 (CN) .......................... 201720708922.7

(51) Int. Cl.
*A47J 27/08* (2006.01)

(52) U.S. Cl.
CPC ...................................... *A47J 27/08* (2013.01)

(58) Field of Classification Search
CPC .............................. A47J 27/08; A47J 27/0813
USPC ............................................. 99/337; 220/240
See application file for complete search history.

(56) References Cited

FOREIGN PATENT DOCUMENTS

| FR | 2796542 A1 | * | 1/2001 | .......... A47J 27/0815 |
| KR | 20120095688 A | * | 8/2012 | .............. A47J 27/08 |

* cited by examiner

*Primary Examiner* — Nhat Chieu Q Do
(74) *Attorney, Agent, or Firm* — Kilpatrick Townsend & Stockton, LLP

(57) ABSTRACT

An inner cover assembly and a lid for a cooking utensil. The inner cover assembly includes: an inner cover having a major axis and a minor axis orthogonal each other; and a seal ring fitted over an outer peripheral edge of the inner cover. When the seal ring is not fitted over the inner cover in a natural state, a smooth transition is provided along an extending direction of the seal ring, and a maximum inner diameter of the seal ring is less than a length of the major axis of the inner cover.

5 Claims, 5 Drawing Sheets

COOKING UTENSIL, INNER COVER ASSEMBLY, AND LID

CROSS-REFERENCE TO RELATED APPLICATIONS

This application is a national stage of International Application No. PCT/CN2017/110471, filed on Nov. 10, 2017, which claims a priority to and benefits of Chinese Patent Application No. 201720707365.7 and 201720708922.7, filed on Jun. 16, 2017, the entire contents of which are incorporated herein by reference.

FIELD

The present disclosure relates to the field of cooking equipment, and more particularly, to an inner cover assembly and a lid for a cooking utensil, and a cooking utensil having the same.

BACKGROUND

In order to cooking ingredients in the shape of a strip, such as fowl, fish, ribs, etc., an oval cooking utensil, such as a pressure cooker, is proposed in the related art. Users need to deliberately align when mounting a seal ring to a cover body, owing to an oval whole configuration of this cooking utensil, it is inconvenient to mount. Moreover, a fastening fit is provided between the seal ring and the cover body, there is less space for free expansion of the seal ring, resulting in poor sealing performance.

SUMMARY

The present disclosure seeks to solve at least one of the problems existing in the related art.

To this end, the present disclosure provides an inner cover assembly for a cooking utensil, self-alignment configuration and reliable sealing can be achieved with a sealing ring of the inner cover assembly.

The present disclosure also provides a cover having the inner cover assembly.

The present disclosure also provides a cooking utensil having the lid.

The inner cover assembly for a cooking utensil according to the present disclosure includes: an inner cover having a major axis and a minor axis orthogonal each other; and a seal ring fitted over an outer peripheral edge of the inner cover. When the seal ring is in a natural state where it is not fitted over the inner cover, a smooth transition is provided along an extending direction of the seal ring, and a maximum inner diameter of the seal ring is less than a length of the major axis of the inner cover.

With the inner cover assembly for a cooking utensil according to the present disclosure, by setting the maximum inner diameter of the seal ring in the natural state less than the length of the major axis of the inner cover, deliberate alignment is needless during assembling, self-alignment arrangement is achieved, and the assembling is reliable.

According to an embodiment, when the seal ring is in the natural state, the maximum diameter of the seal ring is greater than a length of the minor axis of the inner cover.

According to another embodiment, when the seal ring is in the natural state, the seal ring has a horizontal axis and the minor axis orthogonal to each other, a ratio of the major axis to the minor axis is represented by a, a ratio of the horizontal axis to the minor axis is represented by b, and b is less than a.

According to still another embodiment, the inner cover is in a shape of an oval.

In one embodiment, the seal ring is in a shape of a circle in the natural state.

In one embodiment, the seal ring is in a shape of an oval in the natural state.

According to another embodiment, the seal ring includes: a seal body in a shape of a closed loop; and a first skirt and a second skirt arranged on the seal body and spaced apart from each other along an axial direction of the seal body, and the outer peripheral edge of the inner cover being enclosed among the seal body, the first skirt, and the second skirt.

Furthermore, the first skirt and the second skirt obliquely extend along an axial direction of the inner cover from the seal body towards a direction away from the inner cover respectively.

According to still another embodiment, the inner cover is in a shape of plate or a ring.

According to an embodiment, at two ends of the major axis of the inner cover, a tight fit is provided between the seal ring and the inner cover, and at two ends of the minor axis of the inner cover, a clearance fit is provided between the seal ring and the inner cover.

According to another embodiment, along a peripheral direction of the inner cover, as for adjacent ends of the major axis and ends of the minor axis, a fitting clearance between the seal ring and the inner cover gradually reduces in a direction from the ends of the minor axis to the ends of the major axis.

In one embodiment, the inner cover is in a shape of an oval.

Furthermore, when the seal ring is in a natural state where it is not fitted over the inner cover, the seal ring is in a shape of a circle.

In one embodiment, when the seal ring is in a natural state where it is not fitted over the inner cover, the seal ring is in a shape of an oval.

In one embodiment, the inner cover is in a shape of a rectangle, and when the seal ring is in a natural state where it is not fitted over the inner cover, the seal ring is in a shape of a rectangle.

According to another embodiment, the seal ring includes: a seal body in a shape of a closed loop; and a first skirt and a second skirt arranged on the seal body and spaced apart from each other along an axial direction of the seal body, and the outer peripheral edge of the inner cover being enclosed among the seal body, the first skirt, and the second skirt.

Furthermore, the first skirt and the second skirt obliquely extend along an axial direction of the inner cover from the seal body towards a direction away from the inner cover respectively.

According to still another embodiment, the inner cover is in a shape of plate or a ring.

The lid for a cooking utensil, includes: an outer cover; and the inner cover assembly according to one embodiment of the present disclosure, the inner cover being mounted in the outer cover.

As for the lid according to the present disclosure, the sealing performance of the cooking utensil is effectively improved by using the inner cover assembly for a cooking utensil according to the above embodiments.

The cooking utensil, includes: a utensil body; and the lid for a cooking utensil, the lid is provided on the utensil body to cover the utensil body, and the seal ring seals a clearance between the lid and the utensil body.

As for the cooking utensil according to the present disclosure, the cooking utensil is convenient to assembly with good sealing performance by using the inner cover assembly for a cooking utensil according to the above embodiments.

Embodiments of present disclosure will be given in part in the following descriptions, become apparent in part from the following descriptions, or be learned from the practice of the embodiments of the present disclosure.

BRIEF DESCRIPTION OF THE DRAWINGS

Embodiments of the present disclosure will become apparent and more readily appreciated from the following descriptions made with reference to the drawings.

REFERENCE NUMERALS

Figure 1:
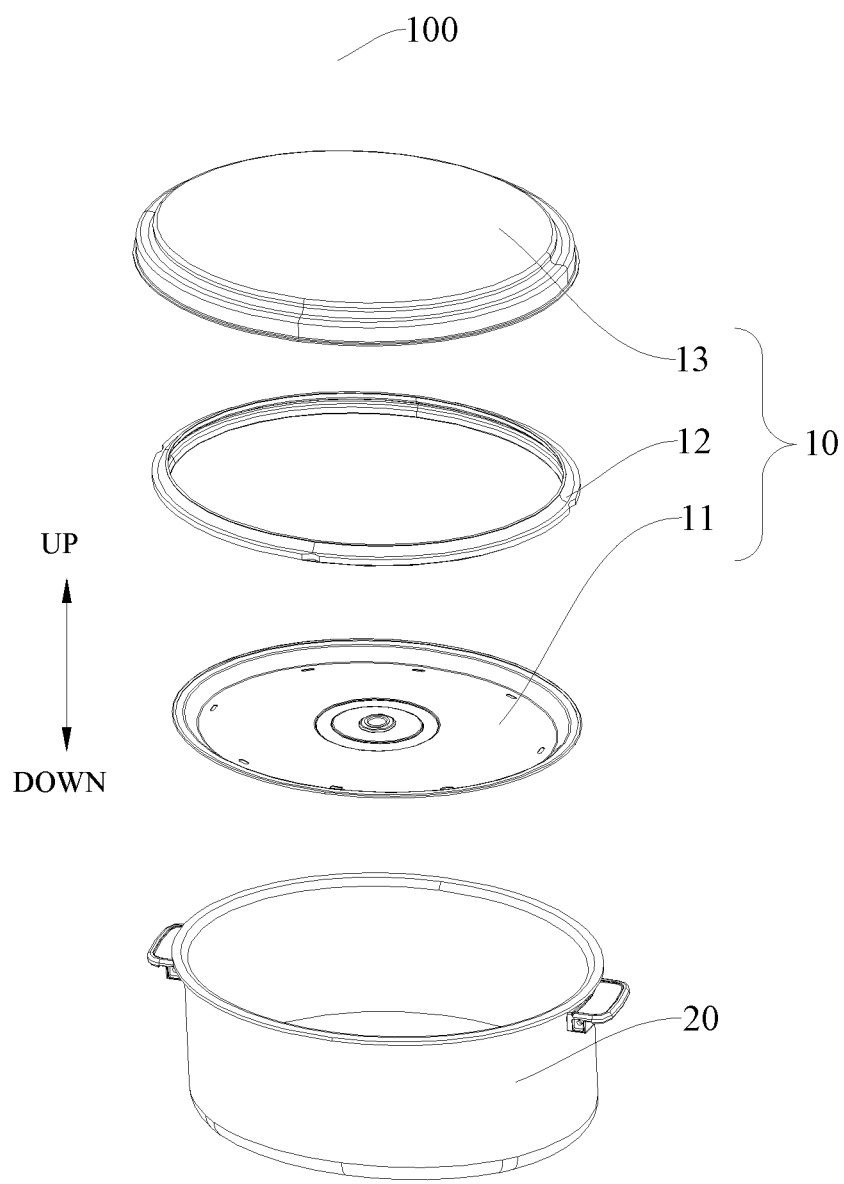
FIG. 1 is an exploded view of a cooking utensil according to embodiments of the present disclosure.
Figure 2:
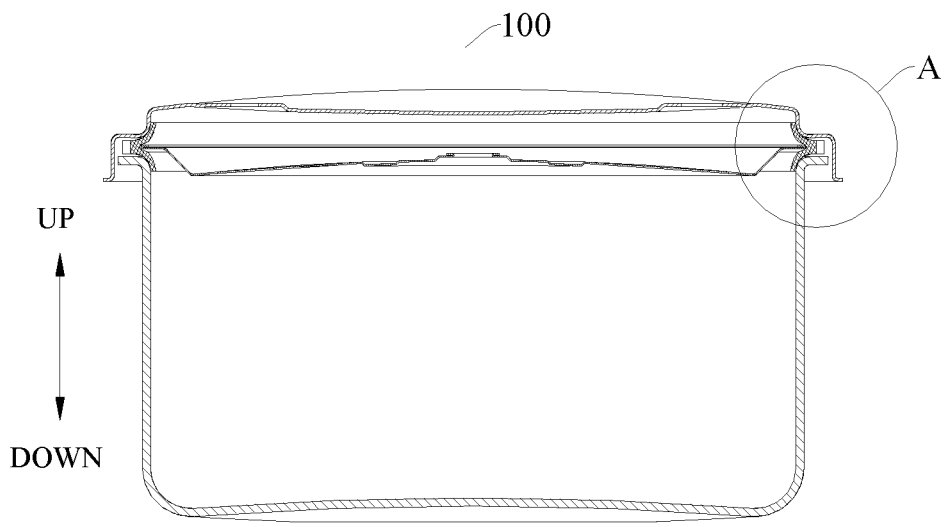
FIG. 2 is a schematic view of a cooking utensil according to embodiments of the present disclosure.

100: cooking utensil;
10: lid; 11: inner cover;
12: seal ring; 121: seal body; 122: first skirt; 123: second skirt;
13: outer cover;
20: utensil body.

DETAILED DESCRIPTION

Embodiments of the present disclosure are described in detail, and examples of the embodiments are depicted in the drawings. The same or similar elements and the elements having same or similar functions are denoted by like reference numerals throughout the descriptions. The embodiments described herein with reference to drawings are explanatory and only used to illustrate the present disclosure. The embodiments shall not be construed to limit the present disclosure.

In the description of the present disclosure, it should be understood that, terms such as "up", "down", "lateral", "top", "bottom," "inner", "outer", "clockwise," "counter-clockwise," "axial," "radial," "circumferential," etc. should be construed to refer to the orientation and position relationship as then described or as shown in the drawings under discussion for simplifying the description of the present disclosure, but do not alone indicate or imply that the device or element referred to may have a particular orientation. Moreover, it is not required that the present disclosure is constructed or operated in a particular orientation, and shall not be construed to limit the present disclosure. In addition, the feature defined with "first" and "second" may indicate or imply that one or more of these features are provided. In the description of the present disclosure, the term "a plurality of" means two or more than two, unless specified otherwise.

In the description of the present disclosure, it should be understood that, unless specified or limited otherwise, the terms "mounted," "connected," and "coupled" are used broadly and may be such as fixed connections, detachable connections, or integral connections; may also be mechanical or electrical connections; may also be direct connections or indirect connections via intervening structures; may also be inner communications of two elements.

An inner cover assembly for a cooking utensil according to embodiments of the present disclosure is described in detail referring to FIG. 1-FIG. 6.

As shown in FIG. 1, the inner cover assembly for a cooking utensil according to embodiments of the present disclosure includes an inner cover 11 and a seal ring 12.

The inner cover 11 has a major axis and a minor axis orthogonal each other, and the seal ring 12 is fitted over an outer peripheral edge of the inner cover 11. In a natural state, i.e., the seal ring 12 is not deformed in any way, prior to a state in which the seal ring 12 is fitted over the inner cover 11, a smooth transition is provided along an extending direction of the seal ring 12, and a maximum inner diameter of the seal ring 12 is less than a length of the major axis of the inner cover 11.

In one embodiment, when the seal ring 12 needs fitting over the inner cover 11, the seal ring 12 is supported and deformed to form a shape matching that of the inner cover 11, assembling of the inner cover assembly can be completed without alignment between the seal ring 12 and the inner cover 11.

According to embodiments of the present disclosure the inner cover assembly, with the setting that the maximum inner diameter of the seal ring 12 in the natural state is less than the length of the major axis of the inner cover 11, deliberate alignment is needless during assembling. Compared to a fit between a cover body and a seal ring in the related art, self-alignment arrangement is achieved, and the assembling is convenient. Moreover, the fit between the seal ring 12 and the inner cover 11 is comparatively reliable, and stable sealing of the inner cover assembly is effectively ensured.

According to an embodiment of the present disclosure, when the seal ring 12 is in the natural state (a state in which the seal ring 12 is not supported by a part and is not deformed in any way, in examples of the present disclosure, that is a state in which the seal ring 12 is not fitted over the inner cover 11), the maximum diameter of the seal ring 12 is greater than a length of the minor axis of the inner cover 11. When the seal ring 12 is fitted over the inner cover 11, the seal ring 12 just covers an end of the minor axis of the inner cover 11, or a fitting clearance is provided between the seal ring 12 and the minor axis of the inner cover 11.

According to another embodiment of the present disclosure, when the seal ring 12 is in the natural state, the seal ring 12 has a horizontal axis and a minor axis orthogonal to each other. When the seal ring 12 is fitted over the inner cover 11, the seal ring 12 is formed in a shape matching that of the inner cover 11 and in a tensioning state, a ratio of the major axis to the minor axis is represented by a. When the seal ring 12 is in the natural state, a ratio of the horizontal axis to the minor axis is represented by b, and a (the ratio of the major axis to the minor axis, when the seal ring 12 is in the tensioning state,) is greater than b (the ratio of the horizontal axis to the minor axis, when the seal ring 12 is in the natural state). In such manner, when the seal ring 12 is fitted over the inner cover 11, the seal ring 1 is in the tensioning state, the fit between the seal ring and the inner cover 11 is reliable, reliable sealing is also can be achieved even in condition of off normal assembling.

Figure 5:
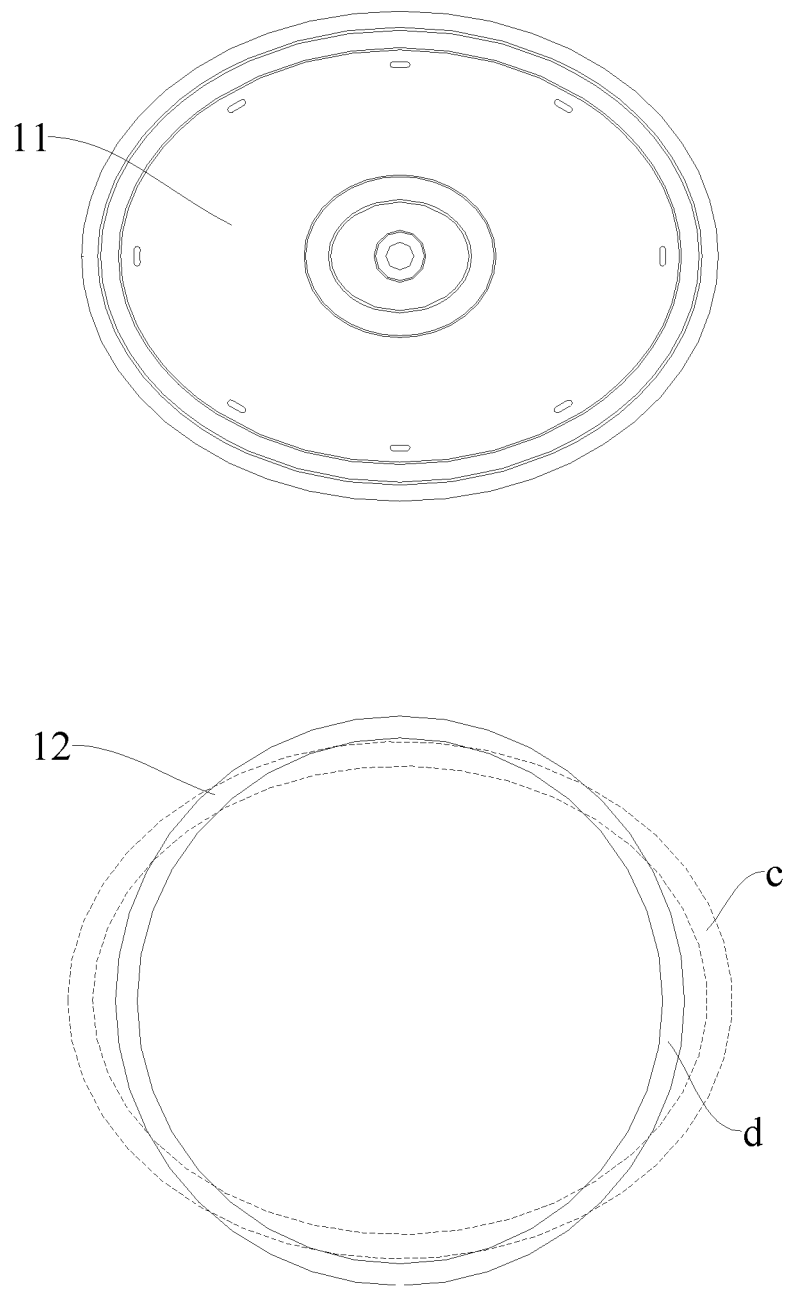
FIG. 5 is an exploded view of an inner cover assembly of a cooking utensil according to embodiments of the present disclosure.
Figure 6:
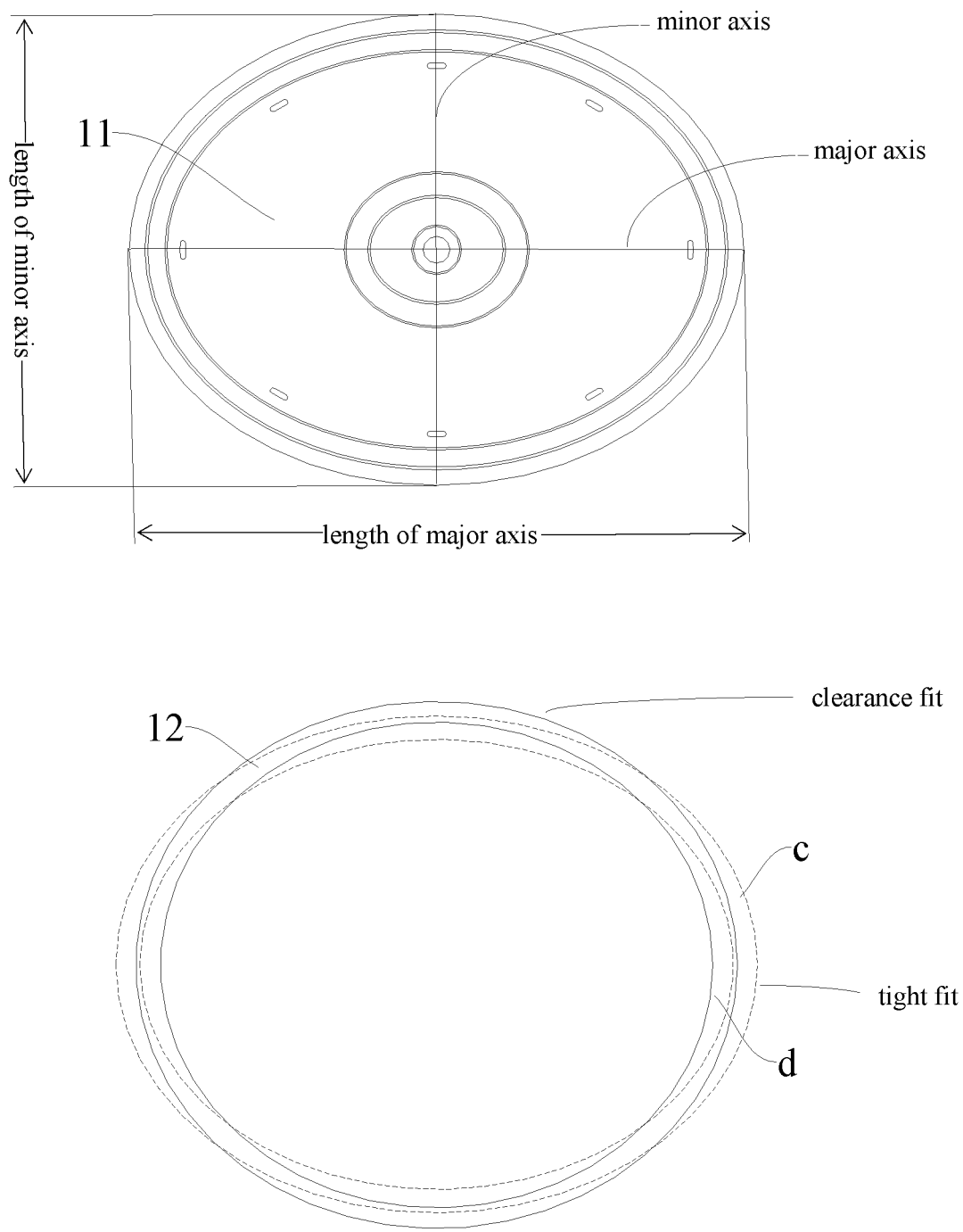
FIG. 6 is an exploded view of an inner cover assembly of a cooking utensil according to another embodiment of the present disclosure.

As shown in FIG. 5 and FIG. 6, in one embodiment, the inner cover 11 is formed in the shape of an oval, the oval inner cover 11 referred herein means that an outer contour of the inner cover 11 is substantially oval. Correspondingly, when the seal ring 12 is fitted over the inner cover 11, the seal ring is supported in a shape of a matching oval.

As shown in FIG. 5, in one embodiment, the seal ring 12 is in the shape of a circle in the natural state (a state d shown in FIG. 5), the so called natural state refers to a state in which the seal ring 12 is not supported by any part and not deformed, that is the seal ring 12 is not fitted over the inner cover 11. In such manner, when the circular seal ring 12 is fitted over the oval inner cover 11, the seal ring 12 is supported into the shape of the matching oval (in a state c as shown in FIG. 5) and is in the tensioning state, achieving reliable fit with the inner cover 11.

As shown in FIG. 5, in one embodiment, the seal ring 12 is in the shape of an oval in the natural state (a state d shown FIG. 6), the so called natural state refers to a state in which the seal ring 12 is not supported by any part and not deformed, that is the seal ring 12 is not fitted over the inner cover 11. It should be noted herein that, the oval outer contour of the seal ring 12 can be the same as or different from the oval outer contour of the inner cover 11, and they can be different in size. In one embodiment, the oval outer contour of the seal ring 12 is less than the oval outer contour of the inner cover 11, in such manner, when the oval seal ring 12 is fitted over the oval inner cover 11, the seal ring 12 is supported into the shape of the oval matching the oval of the inner cover 11 (in the state c as shown in FIG. 5), and a tensioning fit is provided between the seal ring 12 and the inner cover 11, improving the sealing performance of the inner cover assembly.

Figure 3:
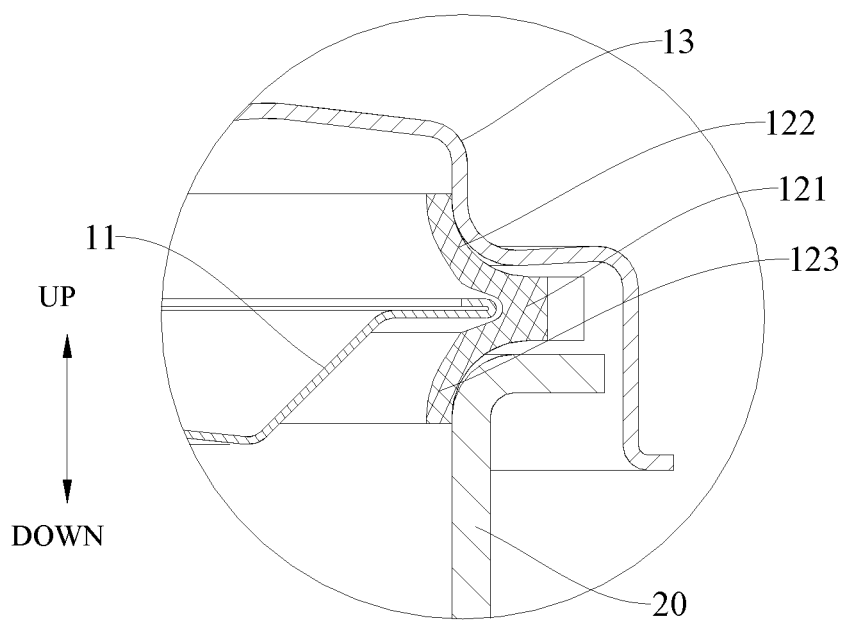
FIG. 3 is an enlarged view of part A in FIG. 2.

As shown in FIG. 3, according to another embodiment of the present disclosure, the seal ring 12 includes a seal body 121, a first skirt 122, and a second skirt 123. The first skirt 122 and the second skirt 123 are separately arranged on the seal body 121 and spaced apart from each other along an axial direction of the seal body 121. When the seal ring 12 is fitted over the inner cover 11, the inner cover 11 is enclosed among the seal body 121, the first skirt 122, and the second skirt 123. The seal ring 12 is not easy to separate from the inner cover 11, the assembling is reliable, and the sealing performance between the seal ring and the inner cover 11 is good.

Furthermore, the first skirt 122 and the second skirt 123 obliquely extend along an axial direction of the inner cover 11 from the seal body 121 towards a direction away from the inner cover 11 respectively. In one embodiment, the first skirt 122 obliquely extends upwards and inwards in an radial direction of the seal body 121, and the first skirt 122 obliquely extends downwards and inwards in an radial direction of the seal body 121, in such manner, the sealing performance between the seal ring 12 and the inner cover 11 can be guaranteed, and the inner cover 11 is firmly clamped between the first skirt 122 and the second skirt 123.

In one embodiment, the inner cover 11 is in the shape of a plate or a ring, as shown in FIG. 5, the inner cover 11 is formed as an oval plate, in addition, the inner cover 11 also can be formed as an oval ring, which is not limited herein.

According to embodiments of the present disclosure, the lid 10 for a cooking utensil includes the outer cover 13 and the inner cover assembly for a cooking assembly, and the inner cover 11 is mounted in the outer cover 13.

Since the inner cover assembly according to embodiments of the present disclosure brings about the lid 10 according to embodiments of the present disclosure also can bring about the above embodiments. Therefore, the lid 10 is good in sealing, convenient to mount, and reliable.

The cooking utensil 100 according to embodiments of the present disclosure includes the utensil body 20 and the lid 10 for the cooking assembly, the lid 10 is provided on the utensil body 20 to cover a containing chamber defined by the utensil body 20, the seal ring 12 seals the clearance between the lid 10 and the utensil body 20.

As for the cooking utensil 100 according to embodiments of the present disclosure, the sealing performance of the cooking utensil 100 is effectively improved by dynamic fit between the seal ring 12 and the inner cover 11, steam leakage is overcome, providing good user experience.

The inner cover assembly for a cooking utensil according to embodiments of the present disclosure is described referring to FIG. 1 to FIG. 4.

As shown in FIG. 1, the inner cover assembly for a cooking utensil according to embodiments of the present disclosure includes the inner cover 11 and the seal ring 12.

The inner cover 11 has a major axis and a minor axis orthogonal each other, and the seal ring 12 is fitted over an outer peripheral edge of the inner cover 11. At two ends of the major axis of the inner cover 11, a tight fit is provided between the seal ring 12 and the inner cover 11, and at two ends of the minor axis of the inner cover 11, a clearance fit is provided between the seal ring 12 and the inner cover 11.

In one embodiment, the tight fit is provided between the seal ring 12 and the two ends of the major axis of the inner cover 11 without clearance, the seal ring 12 is fitted with the two ends of the minor axis of the inner cover 11 with a clearance, in such a manner, a dynamic fit is provided between the seal ring 12 and the inner cover 11, the seal ring 12 can freely expand on the inner cover 11.

As for the inner cover assembly according to embodiments of the present disclosure, the seal ring 12 is tightly fitted with the inner cover 11 at ends of the major axis, and the seal ring 12 is fitted with the inner cover 11 at ends of the minor axis with clearance. Compared with the fitting manner between a cover body and the seal ring in the related art, dynamic fit is achieved, and deliberate alignment is needless during assembling. Moreover, there is clearance between the seal ring 12 and the inner cover 11 for free expansion, guaranteeing stability of sealing of the inner cover assembly.

According to an embodiment of the present disclosure, along the peripheral direction of the inner cover 11, as for adjacent ends of the major axis and ends of the minor axis, the fitting clearance between the inner cover 11 and the seal ring 12 gradually reduces in a direction from the ends of the minor axis to the ends of the major axis, that is, in a direction from the clearance fit between the seal ring 12 and the ends of the minor axis of the inner cover 11 to the tight fit at the ends of the major axis, the clearance between the inner cover 11 and the seal ring 12 gradually reduces. The clearance between the seal ring 12 and the inner cover 11 is largest at the ends of the minor axis and smallest at the ends of the major axis, which not only realizes the dynamic fit between the seal ring 12 and the inner cover 11, and but also provides the seal ring 12 with space for free expansion due to the clearance between the inner cover 11 and the seal ring 12.

In one embodiment, the inner cover 11 is formed in the shape of an oval, the oval inner cover 11 referred herein means that an outer contour of the inner cover 11 is substantially oval. Correspondingly, when the seal ring 12 is fitted over the inner cover 11, the seal ring is supported in a shape of a matching oval.

In one embodiment, the seal ring 12 is in the shape of a circle in the natural state, the so called natural state refers to a state in which the seal ring 12 is not supported by any part and not deformed, that is the seal ring 12 is not fitted over the inner cover 11. In such manner, when the circular seal ring 12 is fitted over the oval inner cover 11, the seal ring 12 is supported into the shape of the matching oval. Deliberate alignment is needless during assembling In one embodiment, the seal ring 12 is in the shape of an oval in the natural state, the so called natural state refers to a state in which the seal ring 12 is not supported by any part and not deformed, that is the seal ring 12 is not fitted over the inner cover 11. It should be noted herein that, the oval outer contour of the seal ring 12 can be the same as or different from the oval outer contour of the inner cover 11, and they can be different in size. In one embodiment, the oval outer contour of the seal ring 12 is less than the oval outer contour of the inner cover 11, in such manner, when the oval seal ring 12 is fitted over the oval inner cover 11, the seal ring 12 is supported into the shape of the oval matching the oval of the inner cover 11, and a tight fit is provided at the ends of the major axis of the inner cover 11, and a clearance fit is provided at the ends of the minor axis of the inner cover 11.

In one embodiment, the seal ring 12 is in the shape of a rectangle, that is the outer contour of the inner cover 11 is rectangular, and the seal ring 12 is also rectangular in the natural state. It should be noted herein that, the rectangular outer contour of the seal ring 12 can be the same as or different from the oval outer contour of the inner cover 11, and they can be different in size. In one embodiment, the rectangular outer contour of the seal ring 12 is less than the rectangular outer contour of the inner cover 11. When the oval seal ring 12 is fitted over the oval inner cover 11, a tight fit is provided at the ends of the major axis of the inner cover 11, and a clearance fit is provided at the ends of the minor axis of the inner cover 11.

As shown in FIG. 3, According to another embodiment of the present disclosure, the seal ring 12 includes the seal body 121, the first skirt 122, and the second skirt 123. The first skirt 122 and the second skirt 123 are separately arranged on the seal body 121 and spaced apart from each other along an axial direction of the seal body 121. When the seal ring 12 is fitted over the inner cover 11, the inner cover 11 is enclosed among the seal body 121, the first skirt 122, and the second skirt 123. The seal ring 12 is not easy to separate from the inner cover 11, the assembling is reliable, and the sealing performance between the seal ring and the inner cover 11 is good.

Furthermore, the first skirt 122 and the second skirt 123 obliquely extend along an axial direction of the inner cover 11 from the seal body 121 towards a direction away from the inner cover 11 respectively. In one embodiment, the first skirt 122 obliquely extends upwards and inwards in an radial direction of the seal body 121, and the first skirt 122 obliquely extends downwards and inwards in an radial direction of the seal body 121, in such manner, the sealing performance between the seal ring 12 and the inner cover 11 can be guaranteed, and the inner cover 11 is firmly clamped between the first skirt 122 and the second skirt 123.

Figure 4:
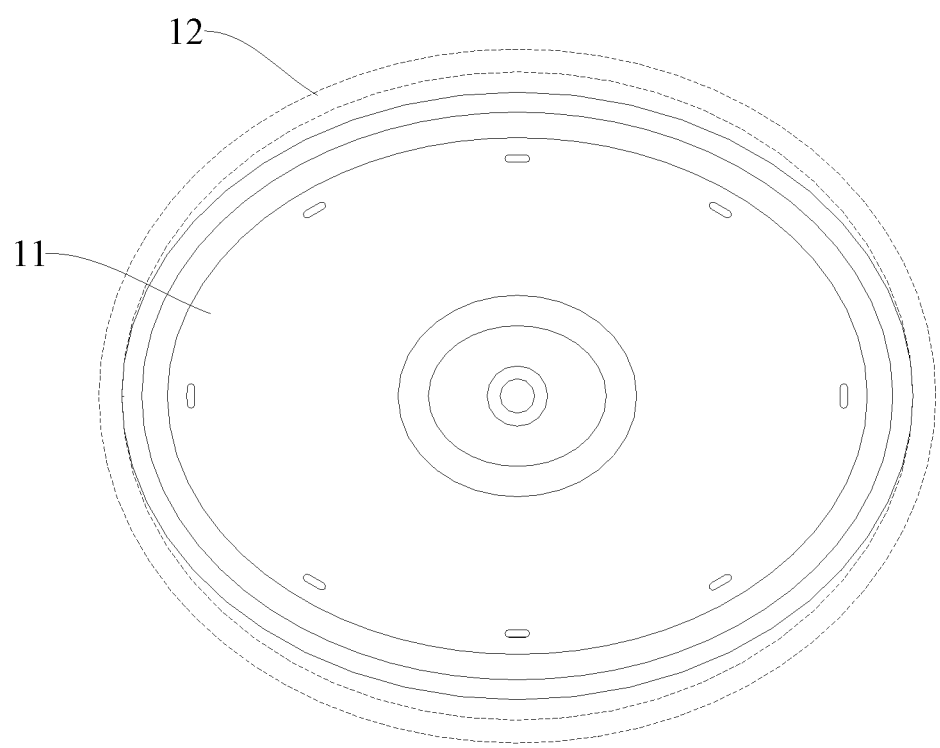
FIG. 4 is a schematic view of an inner cover assembly of a cooking utensil according to embodiments of the present disclosure.

In one embodiment, the inner cover 11 is in the shape of a plate or a ring, as shown in FIG. 4, the inner cover 11 is formed as an oval plate, in addition, the inner cover 11 also can be formed as an oval ring, which is not limited herein.

According to embodiments of the present disclosure, the lid 10 for a cooking utensil includes the outer cover 13 and the inner cover assembly for a cooking assembly, and the inner cover 11 is mounted in the outer cover 13.

Since the inner cover assembly according to embodiments of the present disclosure brings about the above embodiments, the lid 10 according to embodiments of the present disclosure also can bring about the above embodiments. Therefore, the lid 10 is good in sealing and convenient to mount.

The cooking utensil 100 according to embodiments of the present disclosure includes the utensil body 20 and the lid 10 for the cooking assembly, the lid 10 is provided on the utensil body 20 to cover a containing chamber defined by the utensil body 20, the seal ring 12 seals the clearance between the lid 10 and the utensil body 20.

As for the cooking utensil 100 according to embodiments of the present disclosure, the sealing performance of the cooking utensil 100 is effectively improved by dynamic fit between the seal ring 12 and the inner cover 11, steam leakage is overcome, providing good user experience.

Other configurations and operations of the inner cover assembly for a cooking utensil according to embodiments of the present disclosure and the cooking utensil 100 (such as a pressure cooker), which will not described in detail herein.

Throughout the description of the present disclosure, reference to "an embodiment," "some embodiments," "explanatory embodiment", "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. An inner cover assembly for a pressure cooker, the inner cover comprising:
   an inner cover having a major axis and a minor axis orthogonal to each other, wherein lengths of the major axis and the minor axis are different; and
   a seal ring fitted over an outer peripheral edge of the inner cover,
   wherein the seal ring comprises:
      a seal body having a shape of a closed loop; and
      a first skirt and a second skirt arranged on the seal body and spaced apart from each other along an axial direction of the seal body, where the seal body is between the first and second skirts,
   wherein the outer peripheral edge of the inner cover is surrounded by the seal body, the first skirt, and the second skirt,
   wherein when the seal ring is not installed over the inner cover, an inner diameter of the seal ring is less than a length of the major axis of the inner cover and greater than a length of the minor axis of the inner cover, and
   wherein along a peripheral direction of the inner cover, a fitting clearance between the seal ring and the inner cover gradually reduces in a direction from an end of the minor axis to an end of the major axis.

2. The inner cover assembly according to claim 1, wherein the first skirt and the second skirt obliquely extend along an axial direction of the inner cover from the seal body towards a direction away from the inner cover respectively.

3. The inner cover assembly according to claim 1, wherein the inner cover has a shape of a plate or an oval.

4. A lid for a pressure cooker, the lid comprising:
an outer cover; and
an inner cover assembly for the pressure cooker, wherein the inner cover assembly comprises:
   an inner cover having a major axis and a minor axis orthogonal each other, wherein lengths of the major axis and the minor axis are different; and
   a seal ring fitted over an outer peripheral edge of the inner cover,
wherein the seal ring comprises:
   a seal body having a shape of a closed loop; and
   a first skirt and a second skirt arranged on the seal body and spaced apart from each other along an axial direction of the seal body, where the seal body is between the first and second skirts,
wherein the outer peripheral edge of the inner cover is surrounded by the seal body, the first skirt, and the second skirt,
wherein when the seal ring is not installed over the inner cover, an inner diameter of the seal ring is less than a length of the major axis of the inner cover and greater than a length of the minor axis of the inner cover, and
wherein along a peripheral direction of the inner cover, a fitting clearance between the seal ring and the inner cover gradually reduces in a direction from an end of the minor axis to an end of the major axis.

5. A pressure cooker, comprising:
a utensil body; and
a lid, wherein the lid comprises:
   an outer cover; and
   an inner cover assembly for the pressure cooker, wherein the inner cover assembly comprises:
      an inner cover having a major axis and a minor axis orthogonal each other, wherein lengths of the major axis and the minor axis are different; and
      a seal ring fitted over an outer peripheral edge of the inner cover, wherein the seal ring comprises:
      a seal body having a shape of a closed loop; and
      a first skirt and a second skirt arranged on the seal body and spaced apart from each other along an axial direction of the seal body, where the seal body is between the first and second skirts,
   wherein the outer peripheral edge of the inner cover is surrounded by the seal body, the first skirt and the second skirt,
   wherein when the seal ring is not installed over the inner cover, an inner diameter of the seal ring is less than a length of the major axis of the inner cover and greater than a length of the minor axis of the inner cover,
   wherein along a peripheral direction of the inner cover, a fitting clearance between the seal ring and the inner cover gradually reduces in a direction from an end of the minor axis to an end of the major axis, and
   wherein the lid is provided on the utensil body to cover the utensil body, and the seal ring seals a clearance gap between the lid and the utensil body.

\* \* \* \* \*